(12) United States Patent
Wichgers et al.

(10) Patent No.: US 8,098,192 B1
(45) Date of Patent: Jan. 17, 2012

(54) SYSTEM FOR DISTINGUISHING AMONG RADAR RETURNS USING INFORMATION FROM A DATABASE

(75) Inventors: Joel M. Wichgers, Urbana, IA (US); Richard D. Jinkins, Rewey, WI (US); Richard M. Rademaker, Rijswijk (NL); Daniel L. Woodell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 52 days.

(21) Appl. No.: 11/901,058

(22) Filed: Sep. 14, 2007

(51) Int. Cl.
*G01S 13/94* (2006.01)

(52) U.S. Cl. ............ 342/65; 342/63; 342/26 B; 342/73; 342/74; 342/82; 342/89

(58) Field of Classification Search .............. 342/29–40, 342/63–65, 137, 26 B, 73–103
See application file for complete search history.

(56) References Cited

U.S. PATENT DOCUMENTS

| | | | |
|---|---|---|---|
| 2,930,035 A | 3/1960 | Altekruse | |
| 2,965,894 A | 12/1960 | Sweeney | |
| 2,994,966 A | 8/1961 | Senitsky et al. | |
| 3,153,234 A | 10/1964 | Begeman et al. | |
| 3,212,088 A | 10/1965 | Alexander et al. | |
| 3,241,141 A | 3/1966 | Wall | |
| 3,325,807 A | 6/1967 | Burns et al. | |
| 3,397,397 A | 8/1968 | Barney | |
| 3,739,380 A | 6/1973 | Burdic et al. | |
| 3,815,132 A | 6/1974 | Case, Jr. et al. | |
| 4,760,396 A | 7/1988 | Barney et al. | |
| 5,047,775 A * | 9/1991 | Alitz | 342/26 D |
| 5,196,854 A * | 3/1993 | Mathews | 342/26 B |
| 5,781,146 A * | 7/1998 | Frederick | 342/26 B |
| 5,945,926 A * | 8/1999 | Ammar et al. | 340/970 |
| 6,061,016 A * | 5/2000 | Lupinski et al. | 342/159 |
| 6,233,522 B1 * | 5/2001 | Morici | 701/208 |
| 6,236,351 B1 * | 5/2001 | Conner et al. | 342/26 B |
| 6,690,317 B2 * | 2/2004 | Szeto et al. | 342/26 R |
| 6,885,334 B1 * | 4/2005 | Hager et al. | 342/62 |
| 7,129,885 B1 * | 10/2006 | Woodell et al. | 342/26 B |

OTHER PUBLICATIONS

McGrath, John K., *Technical Standard Order*, Department of Transportation, Federal Aviation Administration, Sep. 30, 2004, 11 pages.
U.S. Appl. No. 11/901,084, filed Sep. 14, 2007, Wichgers et al.

* cited by examiner

*Primary Examiner* — Thomas Tarcza
*Assistant Examiner* — Cassie Galt
(74) *Attorney, Agent, or Firm* — Donna P. Suchy; Daniel M. Barbierb

(57) ABSTRACT

A terrain awareness system includes a processor for receiving radar returns and providing terrain and/or obstacle alerts or warnings in response to the radar returns. The processor receives information from a database and the information is used to select the radar transmit function and/or the radar reception function to optimize the performance of the system.

20 Claims, 5 Drawing Sheets

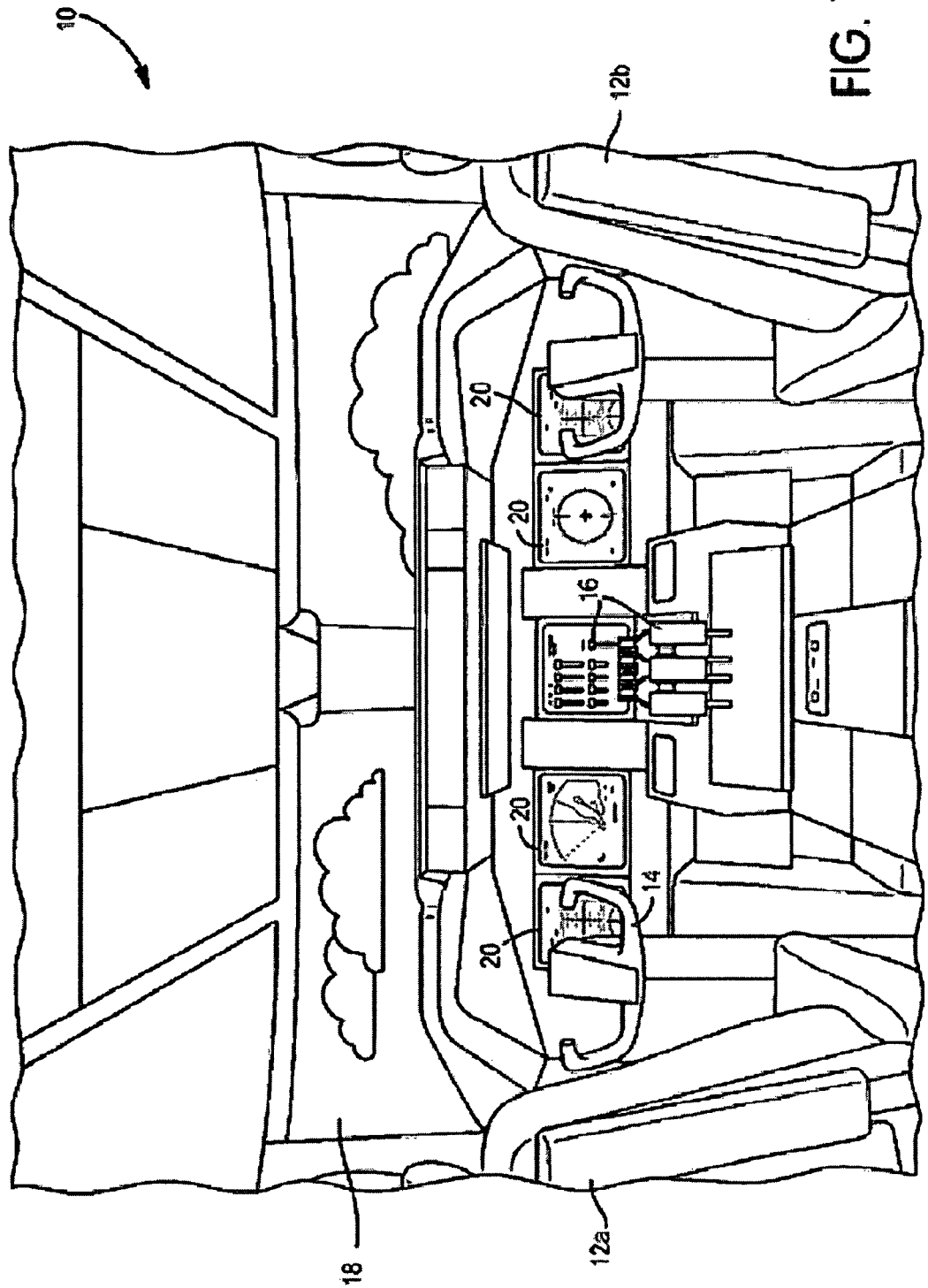

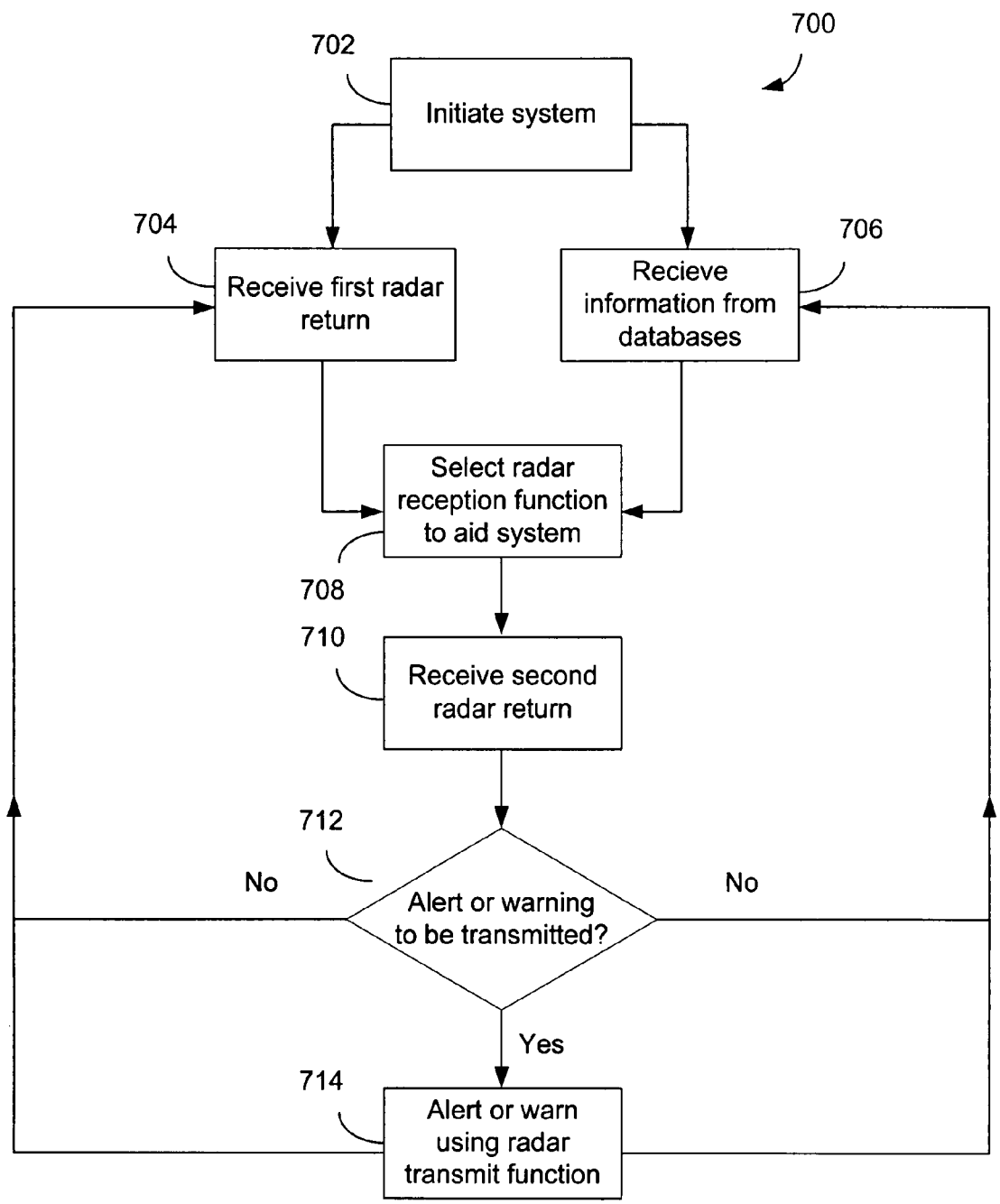

SYSTEM FOR DISTINGUISHING AMONG RADAR RETURNS USING INFORMATION FROM A DATABASE

CROSS-REFERENCE TO RELATED PATENT APPLICATIONS

This disclosure is related to pending U.S. patent application Ser. No. 11/901,084, filed on an even date herewith, entitled "TERRAIN AWARENESS SYSTEM WITH FALSE ALERT SUPPRESSION", and assigned to the assignee of the present application.

BACKGROUND

The present disclosure relates generally to the field of terrain avoidance systems. More specifically, the disclosure relates to a terrain avoidance system that utilizes data base information to aid the transmit and/or receiver processing of the radar information to enable distinguishing between terrain, obstacles, and weather.

Terrain awareness systems (TAS), such as Terrain Awareness Warning Systems (TAWS), typically provide flight crews with information (e.g., alerts, warnings, displays of terrain data, etc.) related to detection of potentially hazardous terrain situations that pose or may pose a threat to continued safe flight and landing of an aircraft and provide warnings or alerts in sufficient time for the flight crew to take effective action to prevent a controlled flight into terrain (CFIT). Terrain awareness systems generally have three alerting functions including a Ground Proximity Warning System (GPWS) alerting function, a Forward Looking Terrain Avoidance (FLTA) alerting function, and a Premature Descent Alerting (PDA) function.

Terrain awareness systems have been implemented using terrain elevation databases to support the FLTA alerting function. These systems look ahead of the aircraft's current position by utilizing a terrain elevation database to determine if there is terrain in regions that would be potentially hazardous to the aircraft.

While not required by the FAA TAWS Technical Standard Order, alerting for obstacles (e.g., man-made structures like towers and buildings) that pose a hazard to the aircraft is often included in TAWS packages. Current TAWS packages tend to solely use obstacle databases to support this additional obstacle alerting function.

An alternative means of compliance with the FAA TAWS forward looking terrain alerting function requirements (which are currently defined in FAA Technical Standard Order (TSO) C115b) is a Radar-based TAWS (R-TAWS). Such a system uses airborne radar sensors (e.g., similar to the radar that is used for weather and windshear detection) to detect terrain and/or obstacles that are potentially hazardous to the aircraft rather than or in addition to using a database. However, this alternative method of detection that uses radar to detect terrain and/or obstacles in regions that may be hazardous to the aircraft may have difficulty achieving an acceptably low false detection rate.

An issue with this alternate means of compliance is distinguishing the difference between terrain, obstacles and weather in the region of interest. What is needed is a means to help distinguish between radar returns of terrain, obstacles and weather such that appropriate information can be used as part of an R-TAWS caution, warning, and alerting strategy for terrain and/or obstacles, as well as a weather and windshear hazard detection strategy.

SUMMARY

One embodiment of the invention relates to a terrain and/or obstacle awareness system that includes a processor for receiving radar returns and proving terrain and/or obstacle alerts or warnings in response to the radar returns. The processor receives information from a database which is used to select a radar transmit function or a radar reception function to optimize performance of the system. The database information may be related to terrain, obstacles, weather, or any combination of terrain, obstacles and weather. The database information may be utilized solely or in combination with the received radar information to identify regions where additional radar scans should be taken to more clearly identify and distinguish between terrain, obstacles and weather such that the best information is available to support the intended function (e.g., R-TAWS). Furthermore, the terrain, obstacle and weather processing may be optimized based upon one or more of the terrain, obstacle or weather databases.

BRIEF DESCRIPTION OF THE DRAWINGS

FIG. 1 is an illustration of an aircraft control center including an R-TAWS, according to one exemplary embodiment.

FIG. 5 is a flow diagram of a method of suppressing alerts or warnings in the R-TAWS of FIG. 1 according to an exemplary embodiment.

DETAILED DESCRIPTION OF THE PREFERRED EMBODIMENTS

Figure 2A:
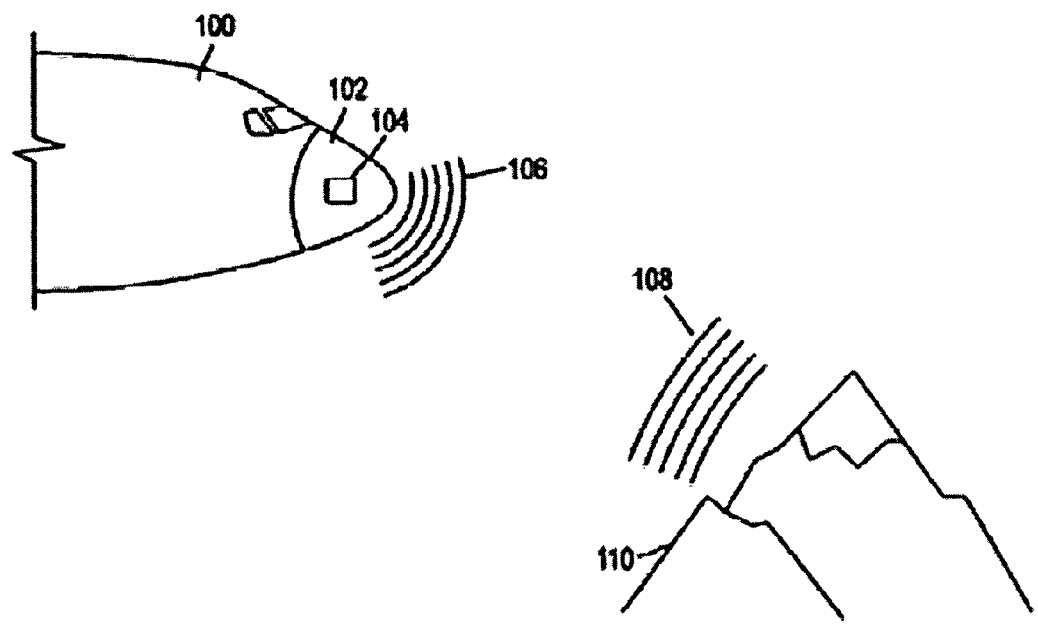
FIG. 2A is an elevation view of an aircraft cone section, which includes the aircraft control center and R-TAWS of FIG. 1 according to an exemplary embodiment.

Before describing in detail the particular improved system and method, it should be observed that the invention includes, but is not limited to a novel structural combination of conventional data/signal processing components and circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, an illustration of a cockpit or an aircraft control center 10 is shown, according to one exemplary embodiment. Aircraft control center 10 may include a pilot seat 12a, a co-pilot seat 12b, an aircraft control stick or yoke 14, a plurality of flight controls 16 and a number of flight displays 20. The pilot sitting in pilot seat 12a may utilize aircraft control stick 14 as well as other flight controls to maneuver an aircraft. The pilot may initiate aircraft maneuvers including moving the aircraft in an upwardly motion, downwardly motion, banking to the left, banking to the right or any combination thereof. The pilot can visually monitor the flight path through a windshield 18. However, if the pilot relies on sight through windshield 18, his or her visual range is limited.

The crew may use flight displays 20 to increase their visual range and to enhance their decision-making abilities. In an exemplary embodiment, flight displays 20 may be configured to show weather, terrain, fixed obstacles (e.g. towers and buildings), variable obstacles (e.g., other aircraft), flight characteristics (e.g., altitude or speed), or any combination thereof.

Referring to FIG. 2A, an aircraft 100 includes an aircraft cone section 102, which includes a terrain awareness system such as a R-TAWS 104. According to one exemplary embodiment, R-TAWS 104 utilizes a broad band directional receiver and an active radar for detection of terrain and/or obstacles, for example terrain 110. In an exemplary embodiment, terrain 110 may instead be a tower, for example a radio tower, a television tower, a bridge, a building, a cellular phone tower, another similar structure, or any combination thereof. In another exemplary embodiment, R-TAWS 104 may be configured to detect multiple obstacles or terrain features. It should be noted that the terrain and obstacle sources can be any source detectable by R-TAWS 104.

In one exemplary embodiment, R-TAWS 104 may be configured to transmit a first radio frequency wave 106 in a predetermined pattern. First radio frequency wave 106 reflects off of terrain 110 to become a second radio frequency wave 108. Second radio frequency wave 108 is detected by R-TAWS 104. In an exemplary embodiment, R-TAWS 104 includes an R-TAWS processor 502 (see FIG. 3) that determines whether second radio frequency wave 108 relates to terrain 110.

Figure 2B:
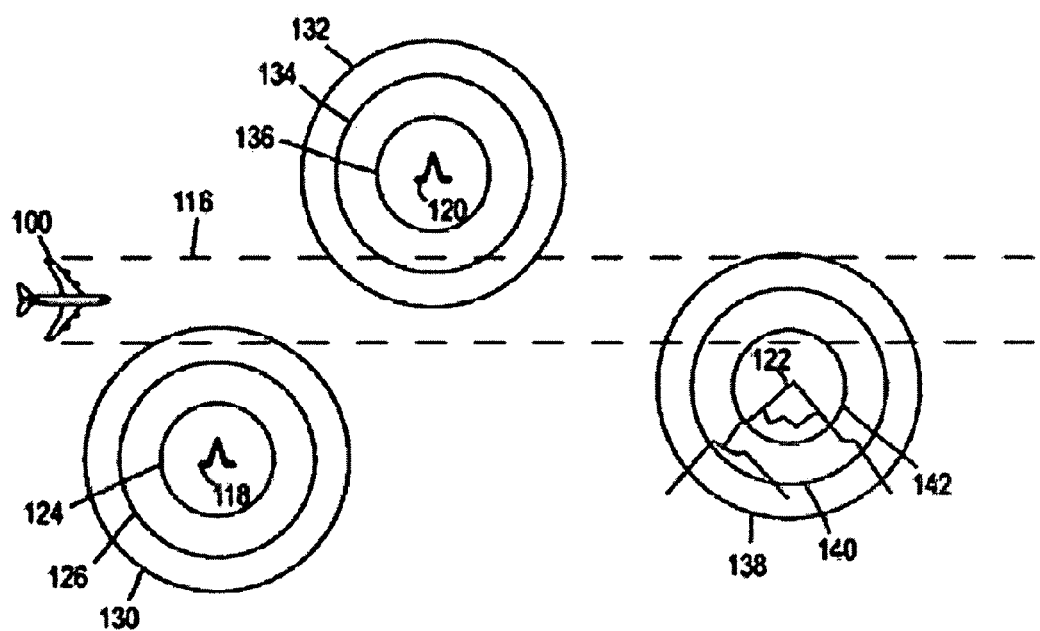
FIG. 2B is an overhead view of the aircraft of FIG. 2A, encountering obstacles along a flight path according to an exemplary embodiment.

In FIG. 2B, an illustration of aircraft 100 traveling on a flight path 116 that will be in proximity to a first tower 118, a second tower 120 and terrain 122 as is shown, according to one example. First tower 118 has a first warning envelope 124, a first caution envelope 126, and a first advisory envelope 130 which surround first tower 118. In this example, flight path 116 will intersect with first advisory envelope 130 and R-TAWS 104 may be configured to transmit an advisory signal and/or message to the flight crew (e.g., on display 20).

Second tower 120 has a second warning envelope 132, a second caution envelope 134, and a second advisory envelope 136 which surround second tower 120. In this example, flight path 116 will intersect with second advisory envelope 136 and second caution envelope 134. R-TAWS 104 may be configured to transmit an advisory signal and/or caution signal to the flight crew (e.g., on display 20).

Terrain 122 has a third warning envelope 138, a third caution envelope 140, and a third advisory envelope 142 which surround terrain 122. In this example, flight path 116 will intersect with third advisory envelope 142, third caution envelope 140 and third warning envelope 138. R-TAWS 104 may be configured to transmit a warning signal and/or message. In another exemplary embodiment, R-TAWS 104 may be configured to transmit an advisory signal based on the distance aircraft 100 is away from terrain 122. In this exemplary embodiment, R-TAWS 104 may be configured to transmit a caution signal as aircraft 100 travels closer to terrain 122. In this exemplary embodiment, R-TAWS 104 may be configured to transmit a warning signal as aircraft 100 continues to approach terrain 122.

It should be noted that according to various exemplary embodiments, the warning envelopes, caution envelopes and advisory envelopes may form a regular shape (e.g., circle, triangle, ellipse, square, rectangle, etc.) or any irregular shape. The shape of the warning envelope is not disclosed in a limiting fashion unless the shape is specifically recited in the claims.

Figure 3:
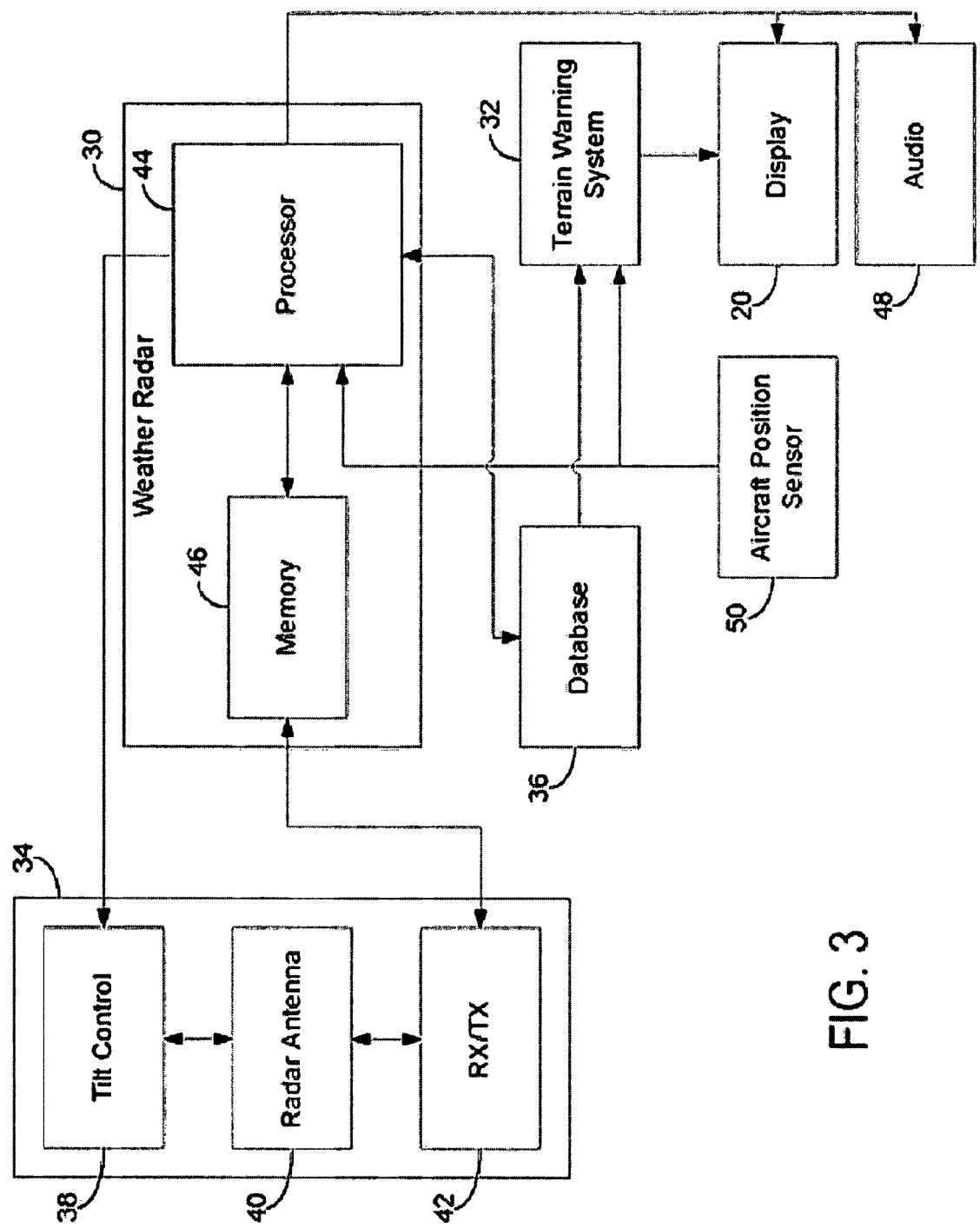
FIG. 3 is a general block diagram of the R-TAWS of FIG. 1 using a terrain database and a weather radar system in accordance with an exemplary embodiment.

Referring to FIG. 3, aircraft 100 includes a weather radar system 30, a terrain warning system 32 (e.g., R-TAWS 104), and an antenna system 34. Antenna system 34 of weather radar system 30 is capable of casting a radar beam(s) and receiving reflective energy from weather systems, terrain, and other obstacles. Weather radar system 30 preferably produces the beam(s) and receives reflectivity energy from various targets while the information is accumulated by a local database and is available for processing by terrain warning system 32. In one embodiment, the local database can be a terrain elevation database 36.

Weather radar system 30 can be similar to the system described in U.S. Pat. No. 6,388,608. Alternatively, weather radar system 30 can be a radar-based wind shear detection system or a monopulse radar system. Advantageously, system 30 is capable of providing terrain elevation estimates or data to a terrain database 36 for use with terrain warning system 32. According to one embodiment, the terrain elevation estimates are provided real time or almost real time as aircraft 100 is operated.

Aircraft 100 preferably includes an antenna system 34 including a tilt control 38, a radar antenna 40, and a receiver/transmitter circuit 42. System 100 preferably includes a processor 44 and a memory 46. System 100 is coupled to display 20 which can be a multi-function flight display, a dedicated display, or any type of visual display.

In a preferred embodiment, weather radar system 30 is configured to provide terrain elevation estimates and system 32 utilizes terrain elevation database 36 to provide terrain warnings or terrain avoidance instructions via display 20 and/or an audio system 48. Although system 30 and 32 are shown as distinct systems, they can be provided as a single system or as parts of other systems or other electronics associated with aircraft 100.

System 32 can be any type of TAWS system that uses a terrain elevation database. System 32 is preferably coupled to a terrain elevation database 36 for receiving terrain elevation estimates. System 32 can be configured to provide warnings and corrective actions to prevent controlled flight into terrain. System 32 can include basic ground proximity warning system (GPWS) alerts, forward-looking terrain avoidance (FLTA), and premature descent alerting (PDA) functions. System 32 can operate according to FAA technical standard order TSO-C115b.

Processor 44 can utilize a variety of techniques for determining or generating terrain elevation estimates for terrain elevation database 36. In one embodiment, processor 44 is configured to have system 30 provide multiple beams swept in azimuth that have different beam elevations. The multiple beams can be used to determine an angle to terrain features using the difference in return power to estimate the target angle within the beam. Using the range with both this intra-beam angle and the beam's center angle, the altitude of the terrain can be determined relative to the altitude of aircraft 100. The use of multiple beams is similar to target angle estimation by lobing between different antennas, each pointing at a different elevation in the terrain detection case. Just as amplitude can be compared between two beams so can the received signal phase to produce a classic monopulse or sequential lobing estimate of the target angle within the beam set.

In another alternative, antenna 40 can be controlled in a single azimuth sweep while the data used to support terrain height estimation is taken with either a vertical monopulse antenna or vertically orientated sequential lobed antenna. In yet another alternative, the antenna may have vertically swept beams using monopulse antennas and receivers to create terrain data or estimates. Such systems have been utilized in military terrain following and terrain alerting (TF/TA) systems. Advantageously, the use of system 30 allows an existing onboard system of aircraft 100 to provide a low-cost integration for onboard calculation of terrain elevation estimates for a terrain elevation database 36.

Processor 44 can receive altitude information from an aircraft position sensor 50 to determine the elevation of the terrain, obstacle or feature of the terrain. Sensor 50 can be a GPS system, an altimeter, radar altimeter, etc. Alternatively, processor 44 can provide a relative terrain data which is used by terrain warning system 32 to determine the sensed terrain elevation.

The terrain elevation estimates can be provided in a variety of forms. In the preferred embodiment, terrain elevation estimates are referenced to mean sea-level. Aircraft altitude is generally referenced to mean sea-level. The terrain data is preferably referenced to geographic coordinates (e.g., latitude, longitude, etc.). Images representative of the terrain data can be displayed as a grayscale or color on an X-Y plane, where colors, darkness or lightness represent altitude. The terrain data can also be provided as a relative terrain with respect to the altitude of the aircraft or flight plan.

Database 36 can be configured in variety of fashions. In one embodiment, database 36 is addressed with respect to geographic location. In another embodiment, database 36 can be addressed with respect to its relative position with respect to the aircraft.

In a preferred embodiment, weather radar system 30 is a pulse Doppler radar system. System 30 preferably includes a weather radar return processing unit (e.g., processor 44) that can calculate standard deviations of wind velocities, a mean velocity parameter, a spectral width parameter, a range parameter, a weather height parameter and reflectivity parameter to generate turbulence alerts, and to provide a display signal to display 20. System 30 is also capable of recording historical data for use in cell growth analysis. In one embodiment, system 30 detects reflectivity by measuring the power of the returned signal. Velocity is measured by detecting changes in phase angle of returned pulses. Spectral width is measured by detection variation in change of phase angle of returned pulses. Cell elevation is determined by comparing return power levels at different tilt angles or by examining data from a volumetric memory representing different altitudes. Alternatively, system 30 can be a monopulse system.

Display 20 preferably provides color graphical images corresponding to the intensity of the radar returns. The graphical images can represent weather regions, rainfall densities, turbulence regions, etc. System 32 can cause display 20 to provide visual indications of potential hazards (e.g., obstacles and terrain) including icons. In one embodiment, audio alerts are also provided on audio equipment 48.

System 30 can be a WXR-2100 MultiScan™ radar system or similar system manufactured by Rockwell Collins configured to include the features associated with terrain database 36. According to certain embodiments, system 30 can be an RDR 4000 system or similar system manufactured by Honeywell International, Inc. configured to include the features associated with terrain elevation database 36. The principles of the present invention are applicable to any aircraft weather radar system. The present invention is not limited to any type of hardware platform.

In operation, processor 44 of system 30 provides signals, either directly to receiver/transmitter circuit 42 or indirectly through memory 46, to provide radar beams at radar antenna 40. Preferably, processor 44 is configured to operate system 30 as a pulse Doppler multi scan, multi-tilt angle radar system or a volumetric radar system in which radar beams are produced at more than one tilt angle. Processor 44 receives radar returns through receiver/transmitter circuit 42.

Processor 44 can receive the radar returns (or signals/data related thereto) directly or through memory 46. Receiver/transmitter circuit 42 can be a single path or can have separate circuits for a receive path and a transmit path. Processor 44 can use radar returns to determine a reflectivity parameter, a mean velocity parameter and/or a spectral width parameter for use by system 30. Processor 44 executes software to effect terrain sensing and weather sensing operations.

Figure 4:
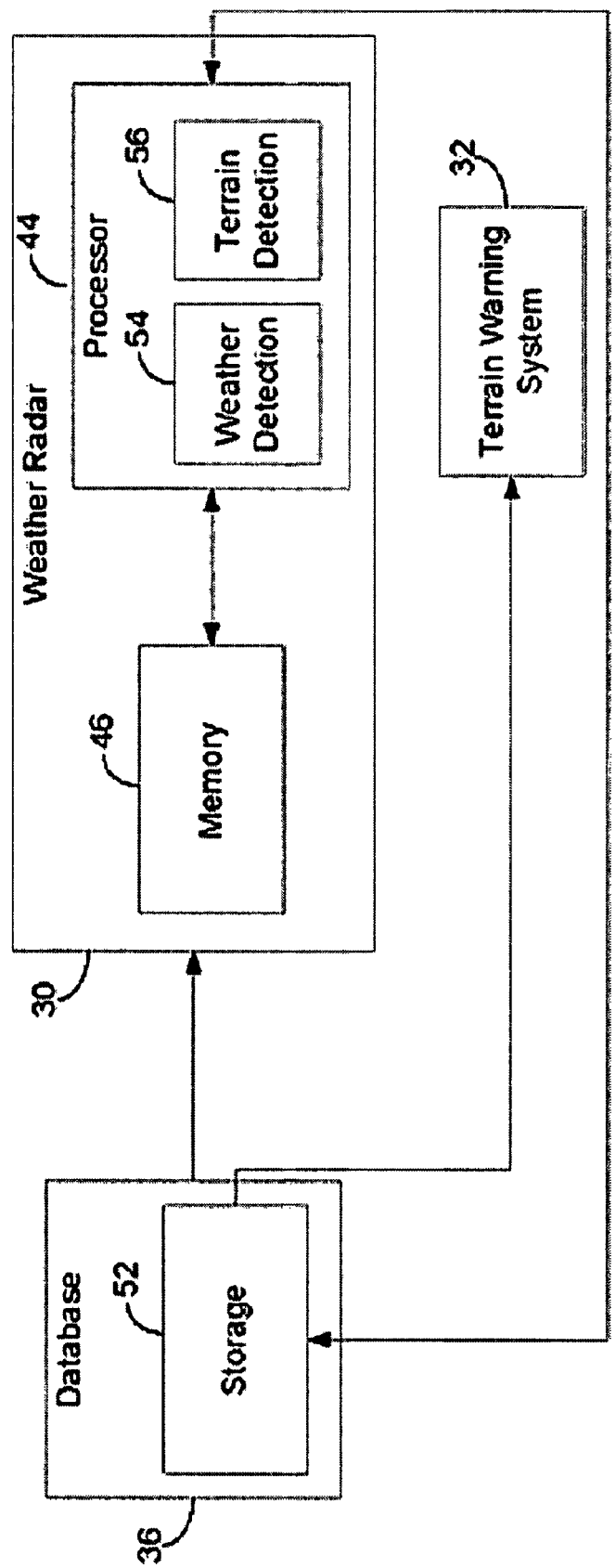
FIG. 4 is a more detailed block diagram of the R-TAWS illustrated in FIG. 3 in accordance with an exemplary embodiment.

With reference to FIG. 4, terrain database 36 receives an input from weather radar system 30. Preferably, terrain elevation estimates are provided to storage 52 of terrain elevation database 36.

Preferably, processor 44 includes a weather detection software module 54 for determining the presence of weather in response to weather radar returns and a terrain detection software module 56 for determining the presence of terrain and obstacles in response to weather radar returns. Modules 54 and 56 preferably operate on the weather radar computing platform associated with system 30. System 30 preferably alternates between weather detection and terrain detection as the flight of aircraft 100 occurs or uses antenna/transmitter pulse patterns that may be used for both the weather and terrain detection function. Dual pulse patterns advantageously reduce the total number of antenna sweeps needed to collect the different kinds of needed data (e.g., for windshear, weather, terrain, obstacle, and runway confirmation).

In one embodiment, system 30 removes data that is related to weather detected by processor 44 before it is stored in storage 52. In this embodiment, system 30 advantageously filters or subtracts out returns from the terrain elevation estimates that are associated with weather features but not with terrain features.

Such a system 30 can utilize various weather detection techniques to determine whether the feature is actual weather. For example, the estimated altitude of the feature associated with the weather radar returns can be compared to a generalized terrain database to determine if it is weather or terrain feature. (e.g., a feature that is detected by the weather radar that is high above the terrain elevation for that location as determined from the database is more likely to be weather than terrain). System 30 can be configured to ignore a feature if its height is well above known parameters (e.g., elevation is above an error factor for the region).

Alternatively, other radar features and signatures can be utilized to determine whether the return is associated with terrain. Doppler conditions can be monitored to detect movement. Doppler mean frequencies can be estimated from radar return data. The difference between the estimated ground modeled Doppler and the radar derived target estimated Doppler frequency may be used to separate ground returns from weather returns. Alternatively, the radar data may be filtered in the frequency domain to reject weather information.

In one embodiment, storage 52 is sized to provide terrain data associated with the flight path. As aircraft 100 passes locations with stored data, storage 52 can over-write these locations with new data from locations in front of the aircraft 100. Alternatively, storage 52 is a global storage base or regional storage base associated with aircraft 100. Storage 52 is gradually built as aircraft flies from destination to destination. If aircraft 100 passes over the same terrain, the existing data in storage 52 can be rewritten or can be averaged to provide new data for the location. In this way, inaccuracies associated with a particular flight path can be reduced as the aircraft passes over the same route. In one embodiment, the averaging can be a weighted average in which older data does not contribute as much to the average as newer data.

Processor 44 may be generally configured to receive radar returns and provide terrain alerts or warnings in response to the radar returns. Processor 44 may receive information (e.g., terrain information, obstacle information, weather information, a hydrology database, a terrain reflectivity database, an obstacle reflectivity database, etc.) from database 36 and use the information to select a radar transmit function or a radar reception function to optimize the performance of system 30. For example, according to one exemplary embodiment, the radar reception function may include filtering for the terrain, obstacles, and weather. Filtering can take place in the frequency domain with Doppler mean frequencies being selected that match the estimated ground return velocity. Doppler frequencies from sidelobes or reflection lobes are different than Doppler frequencies from valid ground returns for a given aircraft velocity, heading, antenna pointing angle, or state and can be rejected. Therefore filtering in the frequency domain can also be used to reject returns from these undesirable antenna beams such as produced by reflection lobes or sidelobes.

Targets may also be filtered by means of identifying radar return spectral width. Weather targets have both the Doppler signature of falling hydrometeors added to the normal radar geometry based Doppler variation. This widening of the radar return spectrum may be used to identify and edit weather from ground. Filtering can also be used in either the spatial length or height domains. Short pulse length and a receiver filter matched to that short length can be used to filter out long returns from volume or area targets when point targets are desired. Weather by nature is a volume target while homogeneous clutter fields are area returns. Targets such as towers or most man made objects are made up of a single dominate reflector or a few large point reflectors. Elevation extent may also be used as a parameter to filter desired from undesired data. Ground returns have a limited vertical extent compared to weather returns. Weather returns generally have vertical extents many thousands of feet while ground returns have vertical extents only as high as the terrain's vertical variation. Vertical extent can be estimated from several horizontal beams sampling space at different beam elevations or by using a single vertical beam that is sampled while the beam is slewed vertically. The change in target return strength with either sample altitude or beam elevation can be matched to the radar beam. Targets that fall off more slowly in elevation are those that have substantial vertical extent.

In another exemplary embodiment, the radar reception function may include filtering for various types of terrain. For example, processor 44 may be capable of filtering for mountainous terrain, rolling hills, relatively flat terrain, rocky terrain, regions over water, urban environments, obstacle rich terrain, etc. In each of these environments, the processing of the radar measurements can be adapted to yield the best estimate of the true terrain elevation. For example, if the underlying terrain is known to be relatively flat, then the terrain elevation processing of the radar measurements can provide more low-pass filtering to remove the high frequency components in the terrain elevation estimates from one terrain cell to the next. If the underlying terrain is known to rapidly change elevation from one terrain cell to the next (as it often does in mountainous regions), then less low-pass filtering of the radar measurements can be done such that real terrain changes are not smoothed out by the radar terrain elevation estimation processing. In another example, known side lobe patterns may be filtered out. In still another example, the radar return may be cross-checked with weather, terrain, obstacle, hydrology, terrain reflectivity, and/or obstacle reflectivity database information for accuracy. If the radar return does not match the radar return that is predicted based upon the database information (e.g., a detected obstacle is not present in the database), the radar return may be temporarily suppressed until it can be confirmed by one or more subsequent radar returns in order to reduce the false alert rate for terrain and/or obstacles. In yet another example, the radar processing function may select to transmit and receive returns from one of multiple antennas or antenna apertures.

According to various exemplary embodiments, the radar transmit function may include selection of transmit power, transmit carrier frequency, pulse width, modulation, pulse transmission rate, scan rate, scan direction, scan orientation, beam shape, another transmission parameter, or any combination thereof. The radar transmit functions may be manually adjusted by the flight crew or may be automatically adjusted based on predetermined settings, weather conditions, radar returns etc. By adjusting the transmit functions for current conditions (e.g., periods of high precipitation) or known factors (e.g., underlying terrain antenna side lobes), the terrain and/or obstacle elevation estimation errors may be reduced.

Processor 44 may be configured to provide additional radar scans for particular regions. For example, processor 44 may provide for elevation scans in addition to horizontal terrain and/or obstacle scans to provide further information about detected terrain and/or obstacles, which may aid in better distinguishing between terrain, obstacles, and weather which will reduce the false alert rate of the terrain warning system. It may also result in better elevation estimates for the terrain, obstacle, and weather cells.

According to one exemplary embodiment, processor 44 may select a radar transmit function or a radar reception function continuously. According to another exemplary embodiment, processor 44 may select a radar transmit function or a radar reception function only during certain conditions (e.g., high precipitation rates, lightning storms, etc.) and have a default selection otherwise.

Referring to FIG. 5, a method 700 that may be executed by R-TAWS 104 for suppressing alerts or warnings in a terrain awareness system is described. The first step is to initialize the system (step 702). The initialization of the method may be triggered by pilot request, or the aircraft may automatically generate the initialization as part of a scheduled update of the flight displays. R-TAWS 104 receives a radar return of terrain and/or an obstacle on the flight path of aircraft 100 (step 704). Concurrently, R-TAWS 104 receives information from a database regarding the area that the radar return analyzed (step 706). The database may be a terrain database, an obstacle database, a weather database, a hydrology database, a terrain reflectivity database, an obstacle reflectivity database, or any combination thereof.

A processor of R-TAWS 104 (e.g., processor 44 of FIG. 3 or FIG. 4) then determines a radar reception function, based on the radar returns and the information provided from the database or databases (step 708). For example, a terrain database may be used to determine what parts of the radar return need to be analyzed again for more clarity. The terrain database may provide information regarding the type of terrain, for example, the terrain may be categorized as flat terrain, rolling hills, mountainous terrain, regions over water, urban environments, etc. Depending on the need for particular information, the processor may select various radar reception functions for all types of terrains. Furthermore, the database information may be used to identify regions that should have additional radar scans (e.g., elevation scans, horizontal scans) to improve performance for detecting potential terrain, obstacle, or weather-related hazards or minimizing the probability of nuisance alerts.

As another example, a weather database may be used to improve performance for detection between terrain, obstacles, and weather. A weather database may be used to determine areas where there is heavy precipitation or other severe weather conditions, and the processor may choose various radar reception functions to analyze various areas of the radar reading. For example, the processor may choose to analyze an area affected by heavy rain using a tilt angle view, while the processor analyzes the rest of the radar return in a normal angle view. The processor, in conjunction with the weather database, may also be able to predict regions that will be affected by weather conditions in the future. The processor may also be able to suppress alarms or warnings by the processor if the weather database determines the reading from the radar return is faulty because of heavy precipitation.

As another example, an obstacle database or a combined terrain/obstacle database may be used to improve performance for detection between terrain, obstacles, and weather. An obstacle database or a combined terrain/obstacle database may help the radar reception function distinguish between terrain and obstacles on a radar return. A radar return may have data that creates a tough time distinguishing between terrain and obstacles. With data from the obstacle database, the radar reception function may process radar returns differently, depending on if the area being processed is an obstacle or terrain. The knowledge acquired of where obstacles are allows the radar reception function to determine regions where additional radar returns would potentially be useful. The radar reception function may also determine where an object might be located, prompting further radar returns from the location such that the object may be clearly identified.

Once a region is chosen to be scanned further, the processor will receive a radar return of the region (step 710). The processor in combination with the database information will then determine whether or not a terrain awareness warning alert should be transmitted to flight display 20 (step 712). If so, a signal will be provided to flight display 20 (step 714). If not, the processor may continue to receive radar returns and information from the database.

Although specific steps are shown and described in a specific order, it is understood that the method may include more, fewer, different, and/or a different ordering of the steps to perform the function described herein.

The exemplary embodiments illustrated in the figures and described herein are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of the radar-based terrain awareness warning system as shown in the various exemplary embodiments is illustrative only. The radar could be replaced with one or more other types of sensors, like an optical sensor, FLIR, LIDAR, millimeter wave sensor, and the like. Although only a few embodiments of the present application have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors and orientations) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application as defined in the appended claims. The order or sequence of any process or method steps may be varied or re-sequenced according to alternative embodiments. In the claims, any means-plus-function clause is intended to cover the structures described herein as performing the recited function and, not only structural equivalents, but also equivalent structures. Other substitutions, modifications, changes and omissions may be made in the design, operating conditions and arrangement of the exemplary embodiments without departing from the scope of the present application as expressed in the appended claims.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store a desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen. It is understood that all such variations are within the scope of the application. Likewise, software implementations of the present application could be accomplished with standard programming techniques with rule-based logic and other logic to accomplish the various connection steps, processing steps, comparison steps and/or decision steps.

The foregoing description of embodiments of the application has been presented for purposes of illustration and description. It is not intended to be exhaustive or to limit the application to the precise form disclosed, and modifications and variations are possible in light of the above teachings, or may be acquired from practice of the application. The embodiments were chosen and described in order to explain the principles of the application and its practical application to enable one skilled in the art to utilize the application in various embodiments and with various modifications as are suited to the particular use contemplated.

What is claimed is:

1. A terrain awareness system, comprising:
a memory; and electronics for receiving radar returns and providing terrain alerts or warnings in response to the radar returns, wherein the electronics receive weather information from a weather database and terrain information from a terrain database in the memory, wherein the weather information in the database being associated with an area and wherein the electronics are configured to select a radar transmit function and/or a radar reception function for the area to adjust performance of the system based on the received radar returns, the terrain information, and the weather information for the area, wherein the weather information indicates an actual weather condition at the area, wherein the electronics provide a filtering function based upon the terrain information, the terrain information comprises an indication of at least a relative flat or mountainous area and wherein the electronics are configured to provide the filtering function in a frequency domain with Doppler mean frequencies being selected for matching an estimated ground return velocity.

2. The system of claim 1, wherein the radar transmit function includes selecting at least one of transmit power, transmit antenna, transmit carrier frequency, pulse width, modulation, pulse transmission rate, scan rate, scan direction, scan orientation, and beam shape.

3. The system of claim 1, wherein the performance is optimized to distinguish between at least one of terrain, obstacles, weather, and aircraft.

4. The system of claim 1, wherein the terrain information is a type of terrain and the weather information is an indication of heavy precipitation or a severe weather condition database addressed with respect to geographic location.

5. A method of performing a terrain alert or warning for an aircraft, the method comprising:
receiving first radar returns at a processor;
receiving weather information from a weather database and terrain information from a terrain database at the processor, the weather information being associated with an area;
wherein the weather information indicates an actual weather condition at the area;
at the processor, selecting a radar function in response to processing of the first radar returns, the terrain information and the weather information in the area;
receiving second radar returns at the processor;
providing the terrain alert from the processor in response to processing the second radar returns, wherein the processor provides a filtering function based upon the terrain information, the terrain information comprises an indication of at least a relative flat area or mountainous area; and
wherein the filtering function includes filtering in a frequency domain with Doppler mean frequencies being selected for matching an estimated ground return velocity.

6. The system of claim of claim 5, wherein the radar function includes selecting at least one of transmit power, transmit antenna, transmit carrier frequency, pulse width, modulation, pulse transmission rate, scan rate, scan direction, scan orientation, and beam shape.

7. A method of performing a terrain alert or warning for an aircraft, the method comprising:
receiving first radar returns at a processor;
receiving weather information from a weather database and terrain information from a terrain database at the processor, the weather information being associated with an area;
wherein the weather information indicates an actual weather condition at the area;
at the processor, selecting a radar function in response to processing of the first radar returns, the terrain information and the weather information in the area;
receiving second radar returns at the processor;
providing the terrain alert from the processor in response to processing the second radar returns, wherein the processor provides a filtering function based upon the terrain information, the terrain information comprises an indication of at least a relative flat area or mountainous area; and
receiving obstacle information from an obstacle database, wherein the radar function is selected to provide additional scans at an obstacle identified from the obstacle database.

8. The method of claim 7, wherein the radar function is selected by the processor to reduce false alarm rates due to a high rate of precipitation associated with the area.

9. The method of claim 7, wherein the radar function is selected by the processor to reduce false alarm rates due to side lobes.

10. The method of claim 7, wherein the radar function is a radar transmit function, wherein the radar transmit function includes selecting at least one of a transmit power, transmit antenna, transmit carrier frequency, pulse width, modulation, pulse transmission rate, scan rate, scan direction, scan orientation, and beam shape.

11. The method of claim 7, wherein the filtering function provides low pass filtering the relatively flat area and high pass filtering over the mountainous area.

12. A terrain awareness system, comprising:
a memory;
processing means for receiving radar returns and providing terrain and/or obstacle alerts or warnings in response to the radar returns, wherein the processing means receives weather information from a weather database and terrain information from a terrain database in the memory, the weather information in the weather database being associated with an area and wherein the received radar returns, the terrain information, and the weather information are utilized by the processing means to select a radar transmit function or a radar reception function to optimize performance of the system in the area; and
wherein the weather information indicates an actual weather condition at the area, wherein the processing means provides a filtering function based upon the terrain information, the terrain information comprises an indication of at least a relative flat or mountainous area, wherein the processing means is configured to provide the filtering function in a frequency domain with Doppler mean frequencies being selected for matching an estimated ground return velocity.

13. The terrain awareness system of claim 12, wherein the processing means is at least partially implemented in a TAWS platform.

14. The terrain awareness system of claim 13 wherein the processing means is at least partially implemented on a weather radar platform.

15. The terrain awareness system of claim 12 wherein the transmit function includes additional elevation and/or horizontal scans targeted at detected objects.

16. The terrain awareness system of claim 15 wherein the detected objects include terrain, obstacles, weather, environmental particulates, other aircraft, or any combination thereof.

17. The terrain awareness system of claim 12 wherein the receive function includes filtering to remove returns associated with side lobes.

18. The terrain awareness system of claim 12 wherein the transmit function includes additional elevation and/or horizontal scans in regions that are operationally relevant to a terrain awareness warning system function.

19. The terrain awareness system of claim 18 wherein the regions that are operationally relevant include at least one of: in front of the aircraft, along the flight path of the aircraft, along the velocity vector of the aircraft, in the direction of a current turn, in the direction of a planned turn, in regions where objects are detected by previous radar returns, in regions where the terrain database indicates that there is a terrain, in regions where an obstacle database indicates obstacles.

20. The terrain awareness system of claim 18 wherein the transmit function determines where to direct additional scans based upon previous radar returns and/or the terrain information.

* * * * *